United States Patent
Chao et al.

(10) Patent No.: US 11,340,835 B2
(45) Date of Patent: May 24, 2022

(54) VIRTUAL NON-VOLATILE MEMORY SYSTEM

(71) Applicant: Dell Products L.P., Round Rock, TX (US)

(72) Inventors: Ching-Lung Chao, Austin, TX (US); Hung-Tah Wei, Round Rock, TX (US); Amber Hokama, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/940,516

(22) Filed: Jul. 28, 2020

(65) Prior Publication Data

US 2022/0035562 A1 Feb. 3, 2022

(51) Int. Cl.
*G06F 3/06* (2006.01)
*G06F 13/16* (2006.01)

(52) U.S. Cl.
CPC .......... *G06F 3/0659* (2013.01); *G06F 3/0604* (2013.01); *G06F 3/065* (2013.01); *G06F 3/0664* (2013.01); *G06F 3/0679* (2013.01); *G06F 13/1668* (2013.01)

(58) Field of Classification Search
None
See application file for complete search history.

(56) References Cited

U.S. PATENT DOCUMENTS

| | | | |
|---|---|---|---|
| 2015/0347151 A1* | 12/2015 | Takefman | G06F 9/4411 713/2 |
| 2017/0206356 A1* | 7/2017 | Iwamura | G06F 21/56 |
| 2017/0235682 A1* | 8/2017 | Masuyama | G06F 3/0658 711/103 |
| 2018/0246775 A1* | 8/2018 | Sankaranarayanan | G06F 11/1048 |
| 2019/0042414 A1* | 2/2019 | Juenemann | G06F 12/0246 |
| 2019/0138236 A1* | 5/2019 | Tsai | G06F 12/0246 |

* cited by examiner

*Primary Examiner* — Jane Wei
(74) *Attorney, Agent, or Firm* — Joseph Mencher

(57) ABSTRACT

A virtual non-volatile memory system includes a BIOS coupled to a non-volatile storage system and a volatile memory system. The BIOS designates a portion of the volatile memory system as a virtual NVDIMM, reserves a portion of the non-volatile storage system for storing virtual NVDIMM data, reports the virtual NVDIMM to an operating system using an ACPI NFIT, and emulates an NVDIMM controller. When a virtual NVDIMM storage event occurs, the BIOS copies data from the portion of the volatile memory system designated as the virtual NVDIMM to the portion of the non-volatile storage system reserved for storing virtual NVDIMM data. When the BIOS subsequently determines that a virtual NVDIMM recovery event has occurred, it copies the data stored in the portion of the non-volatile storage system reserved for storing virtual NVDIMM data to the portion of the volatile memory system designated as the virtual NVDIMM.

17 Claims, 11 Drawing Sheets

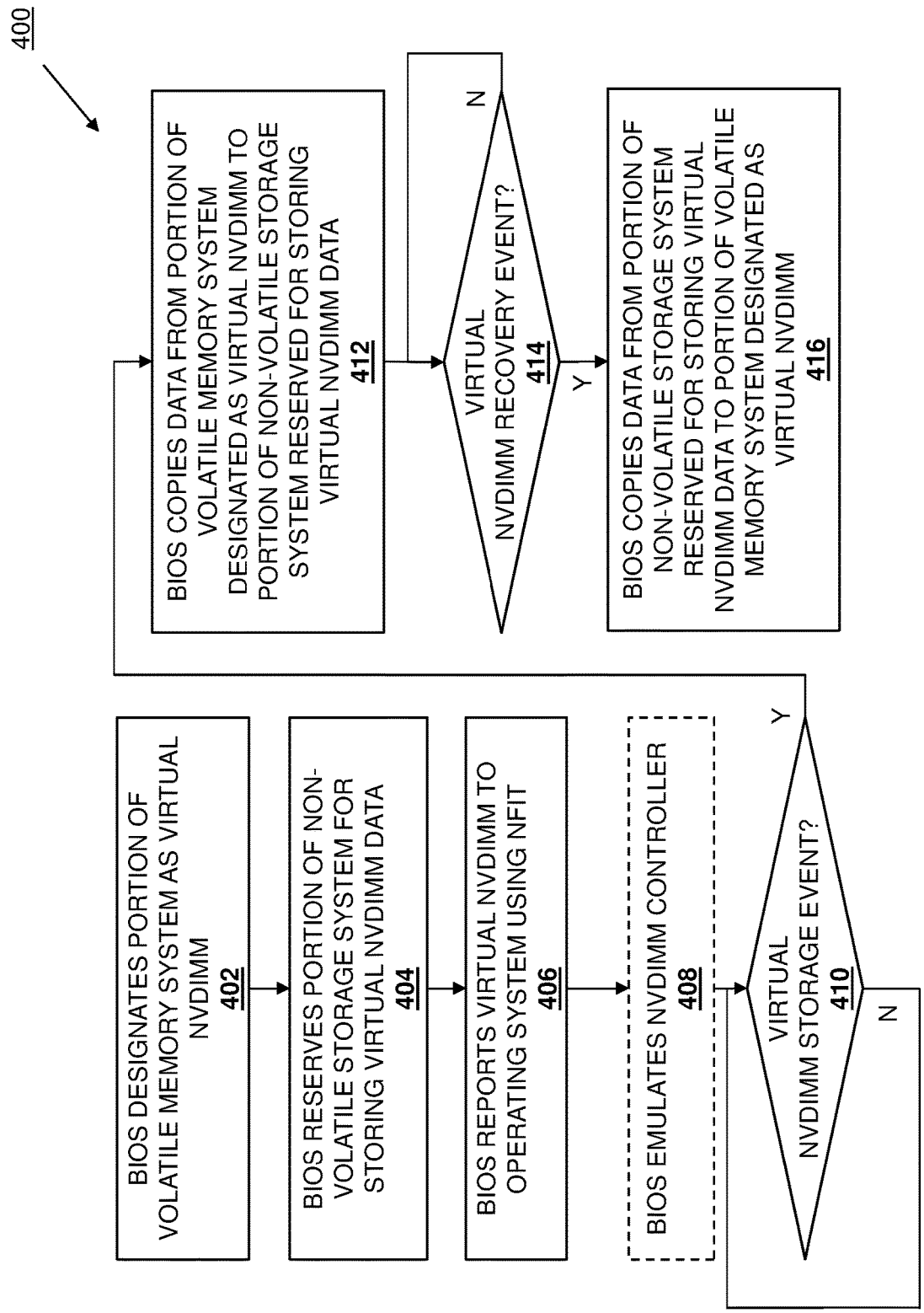

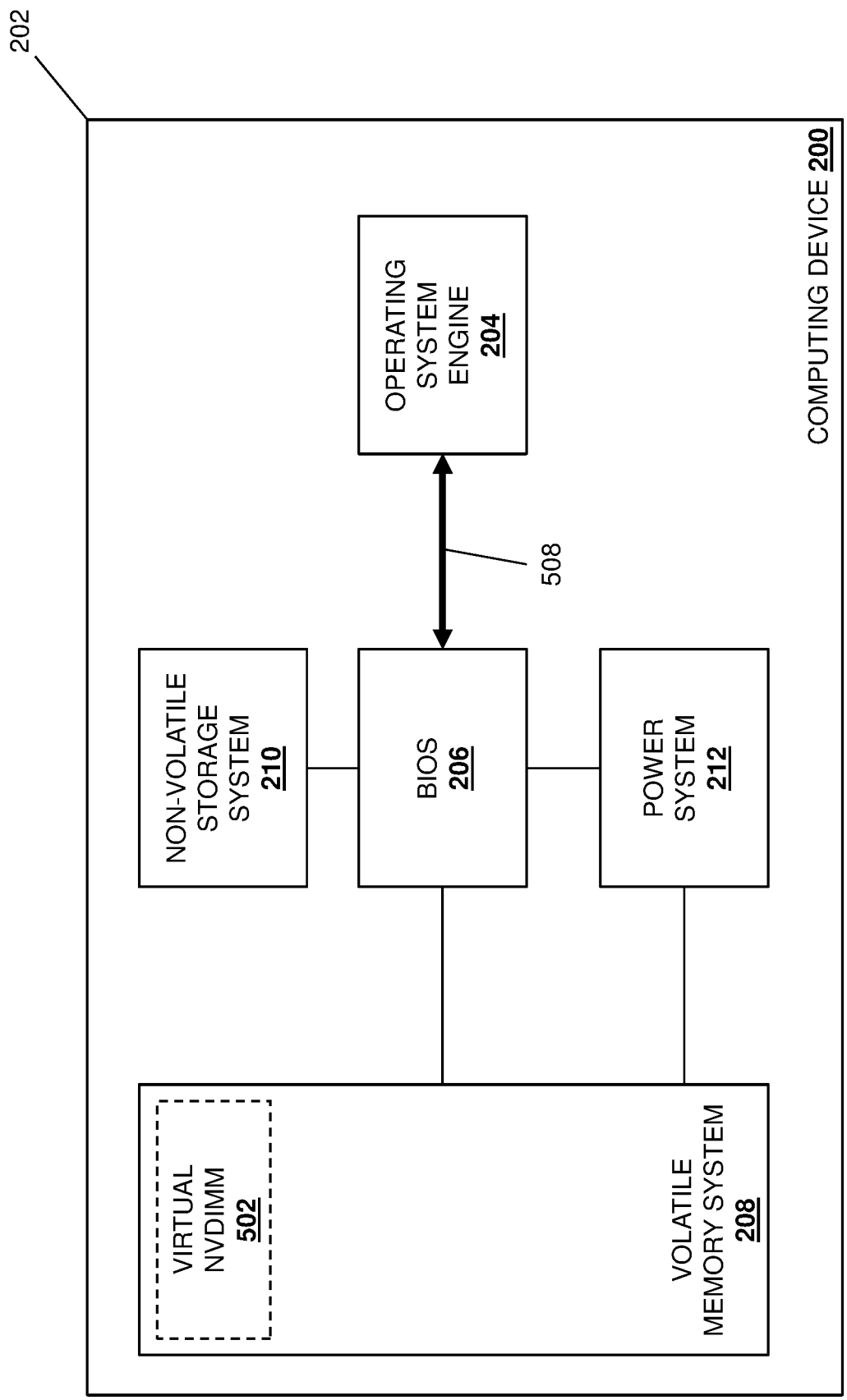

VIRTUAL NON-VOLATILE MEMORY SYSTEM

BACKGROUND

The present disclosure relates generally to information handling systems, and more particularly to providing virtual non-volatile memory in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server computing devices, desktop computing devices, laptop/notebook computing devices, tablet computing devices, mobile phones, and/or other computing devices known in the art, sometime utilize non-volatile memory devices in order to provide for persistent storage of data across power cycles. For example, conventional Copy-To-Flash (C2F) techniques achieve such persistent storage by defining a C2F memory range in a volatile memory system and, in the event of a sudden loss of power, copying the data in that C2F memory range to non-volatile memory device(s) under battery power. Subsequently, that data may be copied from the non-volatile memory device(s) and back to the volatile memory system after power is restored. However, such conventional persistent storage techniques suffer from some issues.

For example, the conventional C2F techniques discussed above are not supported by standard operating system vendors such as MICROSOFT®, LINUX®, and VMWARE®, as the operating systems provided by those operating system vendors require supported non-volatile memory devices to be reported via an Advanced Configuration and Power Interface (ACPI) Non-Volatile Dual Inline Memory Module (NVDIMM) Firmware Interface Table (NFIT) that is configured to report NVDIMMs included in the memory system to the operating system, and the C2F techniques discussed above do not utilize NVDIMMs. As such, non-NVDIMM devices cannot be reported to operating systems via the ACPI NFIT, and thus those operating systems do not support C2F techniques without proprietary solutions that require modification of the operating system. Furthermore, while Dual Data Rate 4 (DDR4) memory systems currently support NVDIMMs that may be reported via the ACPI NFIT to the operating system, Dual Data Rate 5 (DDR) memory systems are not expected to support NVDIMM-N. As such, users that wish to utilize NVDIMM-N capabilities in their computing devices will not be able to do so if those computing devices implement a DDR5 memory system.

Accordingly, it would be desirable to provide a non-volatile memory system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Basic Input/Output System (BIOS) engine that is configured to: designate a portion of a volatile memory system as a virtual Non-Volatile Dual Inline Memory Module (NVDIMM); reserve a portion of a non-volatile storage system for storing virtual NVDIMM data; report the virtual NVDIMM to an operating system using a NVDIMM Firmware Interface Table (NFIT); determine that a virtual NVDIMM storage event has occurred; and copy, in response to determining that the virtual NVDIMM storage event has occurred, data from the portion of the volatile memory system designated as the virtual NVDIMM to the portion of the non-volatile storage system reserved for storing virtual NVDIMM data.

BRIEF DESCRIPTION OF THE DRAWINGS

FIG. 4 is a flow chart illustrating an embodiment of a method for providing virtual non-volatile memory.

FIG. 5C is a schematic view illustrating an embodiment of the computing device of FIG. 2 operating during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
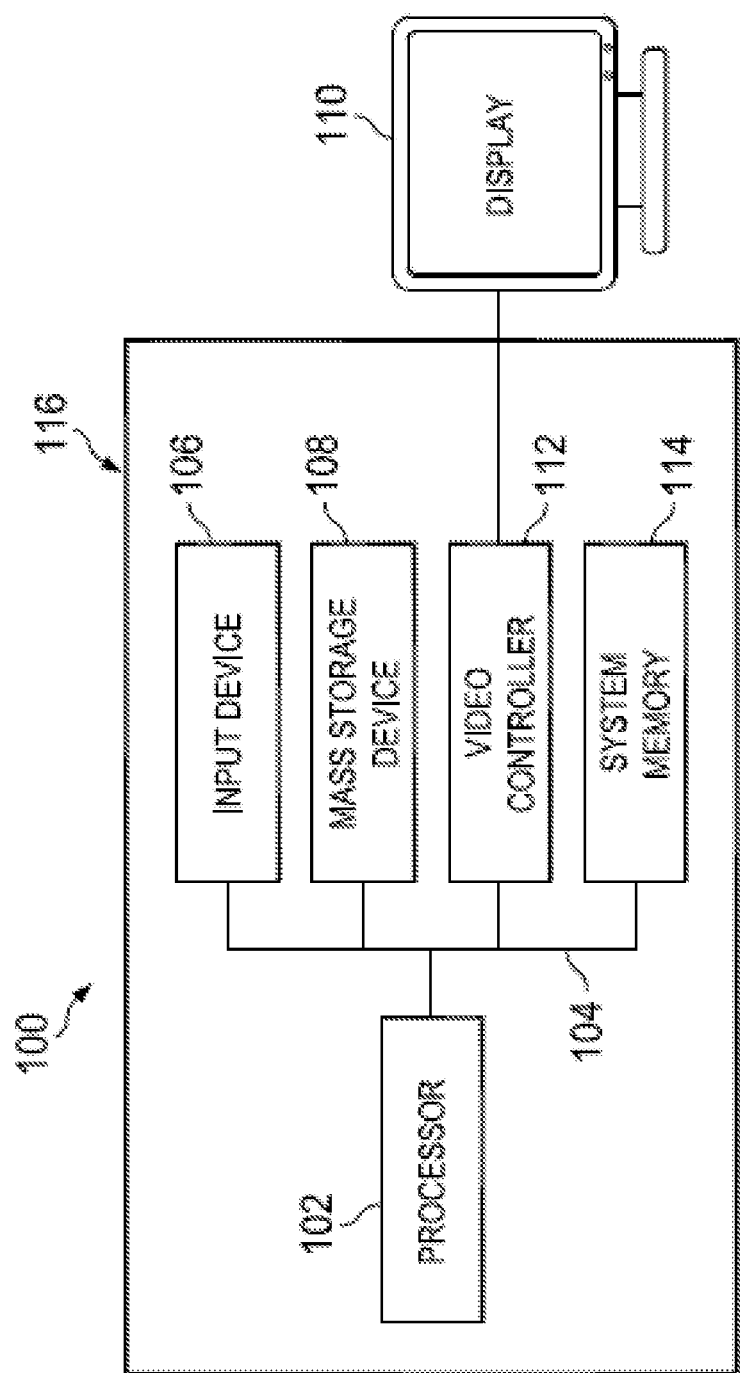
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
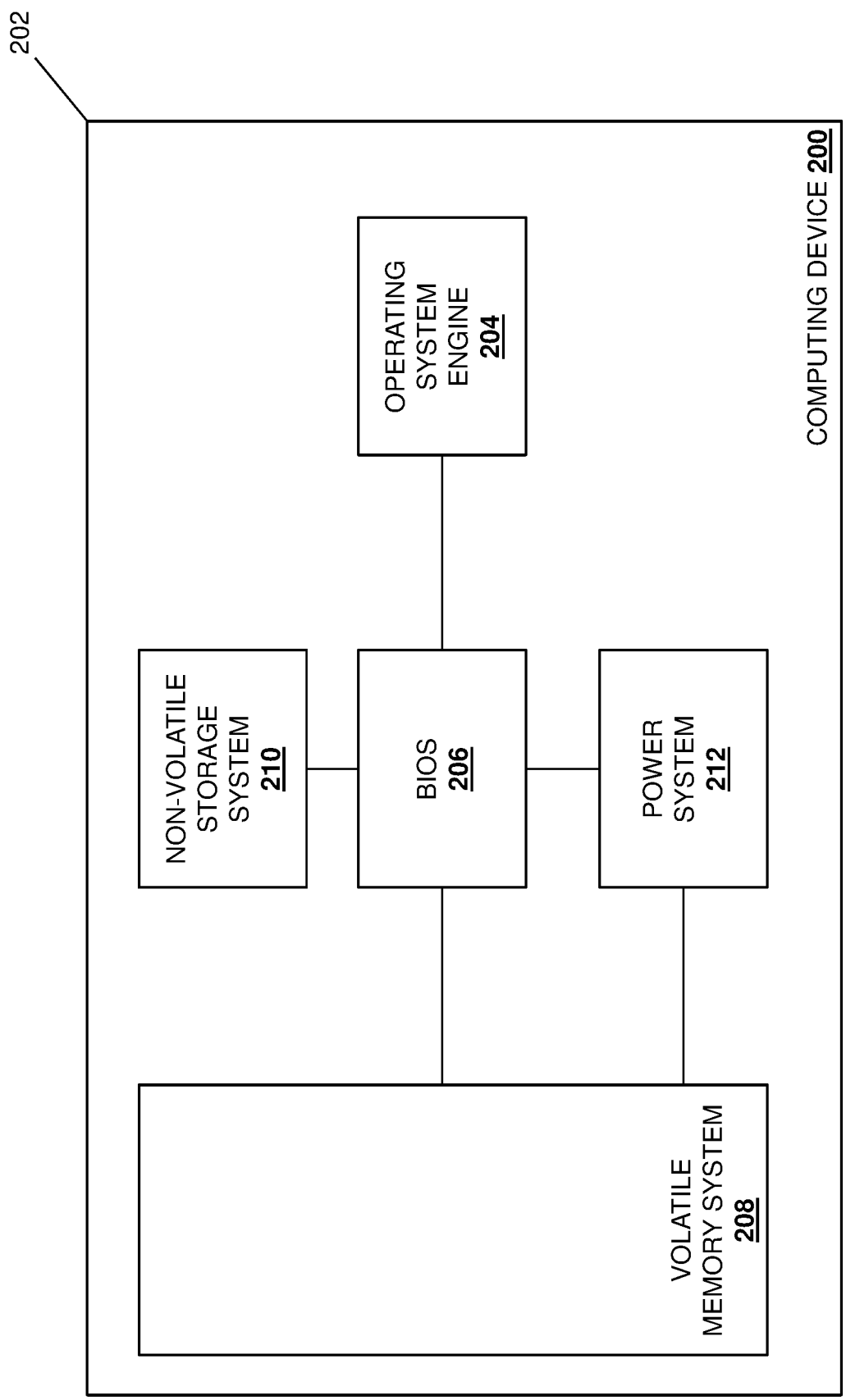
FIG. 2 is a schematic view illustrating an embodiment of a computing device that may utilize the virtual non-volatile memory system of the present disclosure.

Referring now to FIG. 2, an embodiment of a computing device 200 is illustrated that may utilize the virtual non-volatile memory system of the present disclosure. In an embodiment, the computing device 200 may be provided by the IHS 100 discussed above with reference to FIG. 1 and/or may include some or all of the components of the IHS 100, and in specific examples may be provided by a server computing device, a desktop computing device, a laptop/notebook computing device, a tablet computing device, a mobile phone, and/or other computing devices that would be apparent to one of skill in the art in possession of the present disclosure. Furthermore, while illustrated and discussed as being provided by particular computing devices, one of skill in the art in possession of the present disclosure will recognize that the functionality of the computing device 200 discussed below may be provided by other devices that are configured to operate similarly as the computing device 200 discussed below. In the illustrated embodiment, the computing device 200 includes a chassis 202 that houses the components of the computing device 200, only some of which are illustrated below. For example, the chassis 202 may house a primary processing system (not illustrated, but which may include the processor 102 discussed above with reference to FIG. 1 such as a Central Processing Unit (CPU)) and a primary memory system (not illustrated, but which may include the memory 114 discussed above with reference to FIG. 1) that is coupled to the primary processing system and that includes instructions that, when executed by the primary processing system, cause the primary processing system to provide an operating system engine 204 that is configured to perform the functionality of the operating systems and/or computing devices discussed below.

The chassis 302 may also house a Basic Input/Output System (BIOS) 206 that is coupled to the operating system engine 204 (e.g., via a coupling between the BIOS 206 and the primary processing system). As will be appreciated by one of skill in the art in possession of the present disclosure, the BIOS 206 may be provided by firmware and may be used to perform hardware initialization during booting operations (e.g., Power-On StartUp (POST)) for the computing device 200, as well as provide runtime services for the operating system engine 204 and/or other applications/programs provided by the computing device 200. As discussed below, the BIOS 206 may be provided by a BIOS processing system (not illustrated, but which may include the processor 102 discussed above with reference to FIG. 1) and a BIOS memory system (not illustrated, but which may be provided by the memory 114 discussed above with reference to FIG. 1) that includes instruction that, when executed by the BIOS processing system, cause the BIOS processing system to provide a BIOS engine that is configured to performs the operations of the BIOS 210 discussed below. Furthermore, while discussed as being provide by a BIOS, one of skill in the art in possession of the present disclosure will recognize that the BIOS 206 may be provided according to the Unified Extensible Firmware Interface (UEFI) specification, which defines a software interface between operating systems and platform firmware and which was provided to replace legacy BIOS firmware, while remaining within the scope of the present disclosure as well.

The chassis 202 may also house a volatile memory system 208 that is coupled to the BIOS 206. In an embodiment, the volatile memory system 208 may be provided by a plurality of volatile Dual Inline Memory Modules (DIMMs) that one of skill in the art in possession of the present disclosure will recognize may each include a plurality of volatile Dynamic Random Access Memory (DRAM) devices. However, while a specific volatile memory system 208 is illustrated and described below, one of skill in the art in possession of the present disclosure will appreciate that volatile memory systems may include a variety of volatile memory modules and/or volatile memory devices while remaining within the scope of the present disclosure as well. The chassis 202 may also house a non-volatile storage system 210 that is coupled to the BIOS 206. In an embodiment, the non-volatile storage system 210 may be provided by one or more storage devices such as, for example, one or more Hard Disk Drive (HDDs), one or more Solid State Drives (SSDs) such as the Non-Volatile Memory express (NVMe) SSDs discussed below, and/or other non-volatile memory devices that would be apparent one of skill in the art in possession of the present disclosure. However, a specific non-volatile storage system 210 is illustrated and described below, one of skill in the art in possession of the present disclosure will appreciate that non-volatile storage systems may include a variety of non-volatile storage devices while remaining within the scope of the present disclosure as well.

The chassis 202 may also house a power system 212 that is illustrated in FIG. 2 as being coupled to the BIOS 206 and the volatile memory system 208, and that one of skill in the art in possession of the present disclosure will recognize may be coupled to other components in the computing device 200 while remaining within the scope of the present disclosure as well. In an embodiment, the power system 212 may include system power components such as, for example, a Power Supply Unit (PSU), an Alternating Current (AC) power adapter device, and/or other system power components known in the art. Furthermore, as discussed below, the power system 212 may also provide battery power via a battery and/or other battery power components that would be apparent to one of skill in the art in possession of the present disclosure. However, while a specific computing device 200 has been illustrated, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the functionality discussed below, while remaining within the scope of the present disclosure as well.

Figure 3:
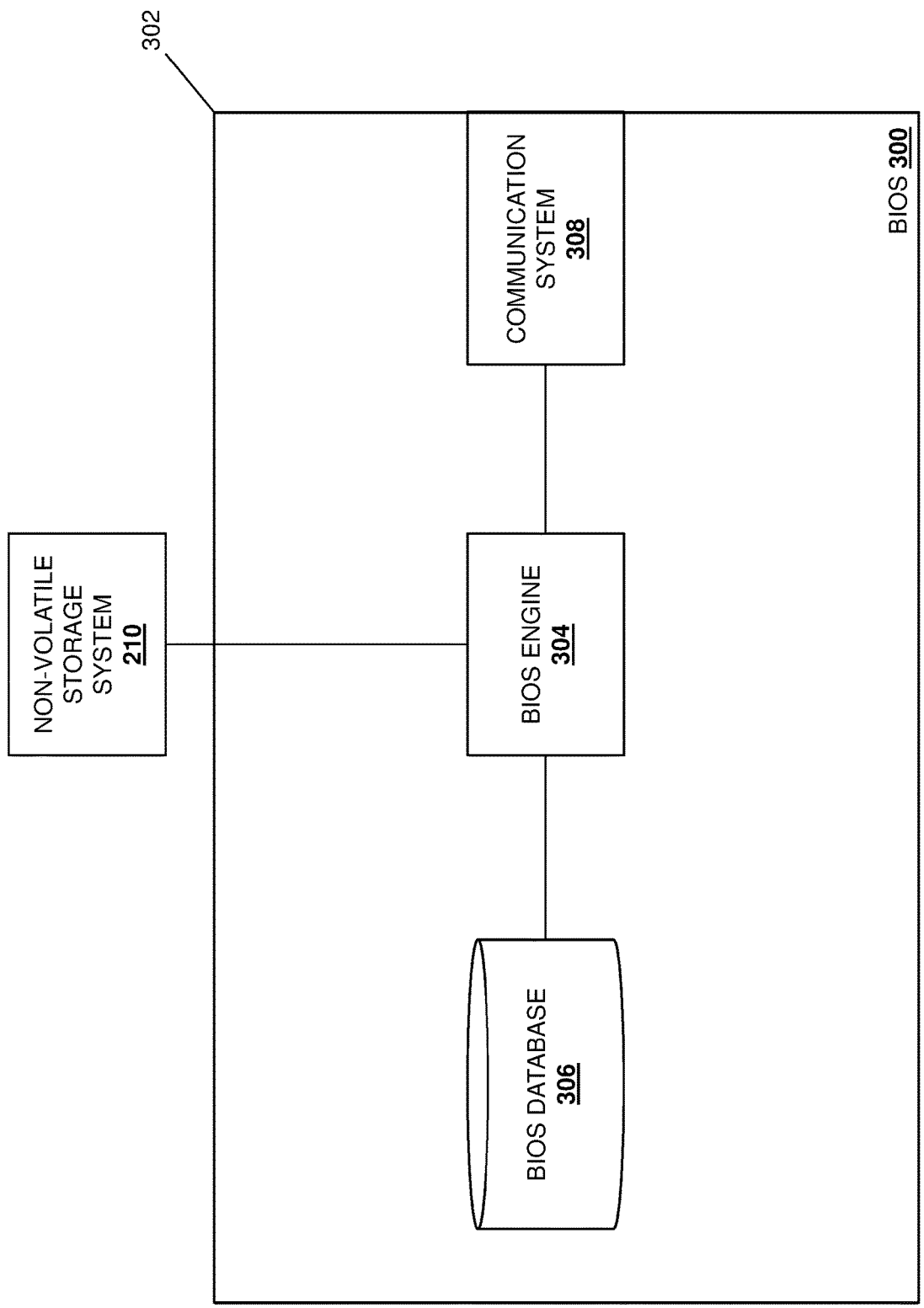
FIG. 3 is a schematic view illustrating an embodiment of a BIOS that may be provided in the computing device of FIG. 2.

Referring now to FIG. 3, an embodiment of a BIOS 300 is illustrated that may provide the BIOS 206 discussed above with reference to FIG. 2. As such, the BIOS 300 may be provided in the IHS 100 discussed above with reference to FIG. 1 and/or the computing device 200 discussed above with reference to FIG. 2, and may include firmware that is used to perform hardware initialization during booting operations (e.g., Power-On Self Test (POST)) for a computing device, as well as provide runtime services for an operating system and/or other applications/programs provided by the computing device. Furthermore, while illustrated and discussed as being provided by a BIOS 200, one of skill in the art in possession of the present disclosure will recognize that the functionality of the BIOS device 200 discussed below may be provided according to the UEFI specification while remaining within the scope of the present disclosure as well. In the illustrated embodiment, the BIOS device 300 includes a chassis 302 (e.g., a circuit board in the computing device 200) that supports the components of the BIOS 300, only some of which are illustrated below. For example, the chassis 302 may support a BIOS processing system (not illustrated, but which may include the processor 102 discussed above with reference to FIG. 1) and a BIOS memory system (not illustrated, but which may include the memory 114 discussed above with reference to FIG. 1) that is coupled to the BIOS processing system and that includes instructions that, when executed by the BIOS processing system, cause the BIOS processing system to provide a BIOS engine 304 that is configured to perform the functionality of the BIOS engines and/or BIOS discussed below. As illustrated in FIG. 3 and discussed in further detail below, the BIOS engine 304 may be coupled to the non-volatile storage system 210 in order to, for example, emulate NVDIMM controller registers and/or perform other operations for providing the virtual NVDIMM functionality described below.

The chassis 302 may also support a storage system (not illustrated, but which may include the storage 108 discussed above with reference to FIG. 1) that is coupled to the BIOS engine 304 (e.g., via a coupling between the storage system and the BIOS processing system) and that includes a BIOS database 306 that is configured to store any of the information utilized by the BIOS engine 304 discussed below. The chassis 302 may also support a communication system 308 that is coupled to the BIOS engine 304 (e.g., via a coupling between the communication system 308 and the BIOS processing system) and that may be provided by any communication components that one of skill in the art in possession of the present disclosure would recognize allow for the BIOS engine communication functionality discussed below. However, while a specific BIOS 300 has been illustrated, one of skill in the art in possession of the present disclosure will recognize that a BIOS (or other devices operating according to the teachings of the present disclosure in a manner similar to that described below for the BIOS 300) may include a variety of components and/or component configurations for providing conventional BIOS functionality, as well as the functionality discussed below, while remaining within the scope of the present disclosure as well.

Referring now to FIG. 4, an embodiment of a method 400 for providing virtual non-volatile memory is illustrated. As discussed below, the systems and methods of the present disclosure provide a virtual non-volatile memory system using a combination of volatile memory system and a non-volatile storage system, and report the virtual non-volatile memory system to an operating system using a NVDIMM Firmware Interface Table (NFIT), which allows standard operating systems to utilize the virtual NVDIMM in the same manner as a physical NVDIMM. For example, the virtual non-volatile memory system includes a BIOS that is coupled to a non-volatile storage system and a volatile memory system, and the BIOS operates to designate a portion of the volatile memory system as a virtual NVDIMM, reserve a portion of the non-volatile storage system for storing virtual NVDIMM data, and report the virtual NVDIMM to an operating system using an NFIT. The BIOS may then determine that a virtual NVDIMM storage event has occurred and, in response, copy data from the portion of the volatile memory system designated as the virtual NVDIMM to the portion of the non-volatile storage system reserved for storing virtual NVDIMM data. As such, non-NVDIMM devices may be treated as virtual NVDIMM devices and reported to standard operating systems via an NFIT, which allows those operating systems to support C2F techniques, NVDIMM-N functionality in DDR5 memory systems that do not support physical NVDIMM-Ns, and/or other NVDIMM operations that would be apparent to one of skill in the art in possession of the present disclosure.

The method 400 begins at block 402 where a BIOS designates a portion of a volatile memory system as a virtual NVDIMM. In an embodiment, at block 402, a user may perform persistent storage request operations with the BIOS 206 in order to request the persistent storage of data in a portion of a memory system in the computing device 200. For example, the persistent storage request operations 500 may be provided as part of C2F techniques that are provided in the computing device 200 and that are configured to allow a user of the computing device 200 to designate a portion of the memory system in the computing device 200 for which persistent storage of data will be provided. In a specific example, setup operations for the BIOS 206 may allow the user of the computing device 200 to select volatile memory devices in the volatile memory system 208 for persistent storage of data, and at block 402 the user may select one or more volatile memory devices (e.g., a volatile DIMM at location "A8") and/or a portion of one or more volatile memory devices in the volatile memory system 208 (e.g., memory range(s) in the volatile memory device(s)) for which persistent storage of data will be provided. However, while the selection of volatile memory device(s) for persistent storage of data has been described as being performed as part of particular persistent storage techniques such as C2F, one of skill in the art in possession of the present disclosure will recognize that the selection of a portion of a volatile memory system in a computing device may be performed in a variety of manners and for a variety of reasons that will fall within the scope of the present disclosure as well.

As such, at block 402, the BIOS engine 304 in the BIOS 206/300 may receive the selection of volatile memory device(s) in the volatile memory system 208 and, in response, may operate to designate a portion of the volatile memory system 208 as a virtual NVDIMM. For example, with reference to FIG. 5A, the BIOS 206 is illustrated as performing virtual NVDIMM designation operations 500 at block 402 that operate to designate a portion of the volatile memory system 208 as a virtual NVDIMM 502. In a specific example, the BIOS engine 304 in the BIOS 206/300 may execute Memory Reference Code (MRC) to discover the volatile memory devices (e.g., volatile DIMMs) in the volatile memory system 208, which one of skill in the art in possession of the present disclosure will recognize will include the BIOS engine 304 reading Serial Presence Detect (SPD) data in the volatile memory devices included in the volatile memory system 208 in order to identify the type of each of those memory devices.

At block 402, the BIOS engine 304 in the BIOS 206/300 may then designate the portion of the volatile memory system 208 selected by the user for persistent storage of data as a virtual NVDIMM 502 by changing the SPD data read from the volatile memory system 208 via the MRC to identify that portion of the volatile memory system 208 as a NVDIMM (e.g., a NVDIMM-N that includes flash storage and DRAM devices on the same module). As will also be appreciated by one of skill in the art in possession of the present disclosure, the execution of the MRC by the BIOS engine 304 in the BIOS 206/300 may include the creation and storage of memory maps in the BIOS database 306 that identify persistent memory included in the computing device 200, and thus the changing of the SPD data to identify the portion of the volatile memory system 208 as a NVDIMM will cause that portion of the volatile memory system 208 that has been designated as a virtual NVDIMM to be identified in the memory maps as persistent memory provided by a NVDIMM-N. However, while a specific technique for designating a portion of a volatile memory system as non-volatile memory has been described, one of skill in the art in possession of the present disclosure will recognize that portion(s) of volatile memory systems may be designated as non-volatile memory in other manners that will fall within the scope of the present disclosure as well.

Figure 5A:
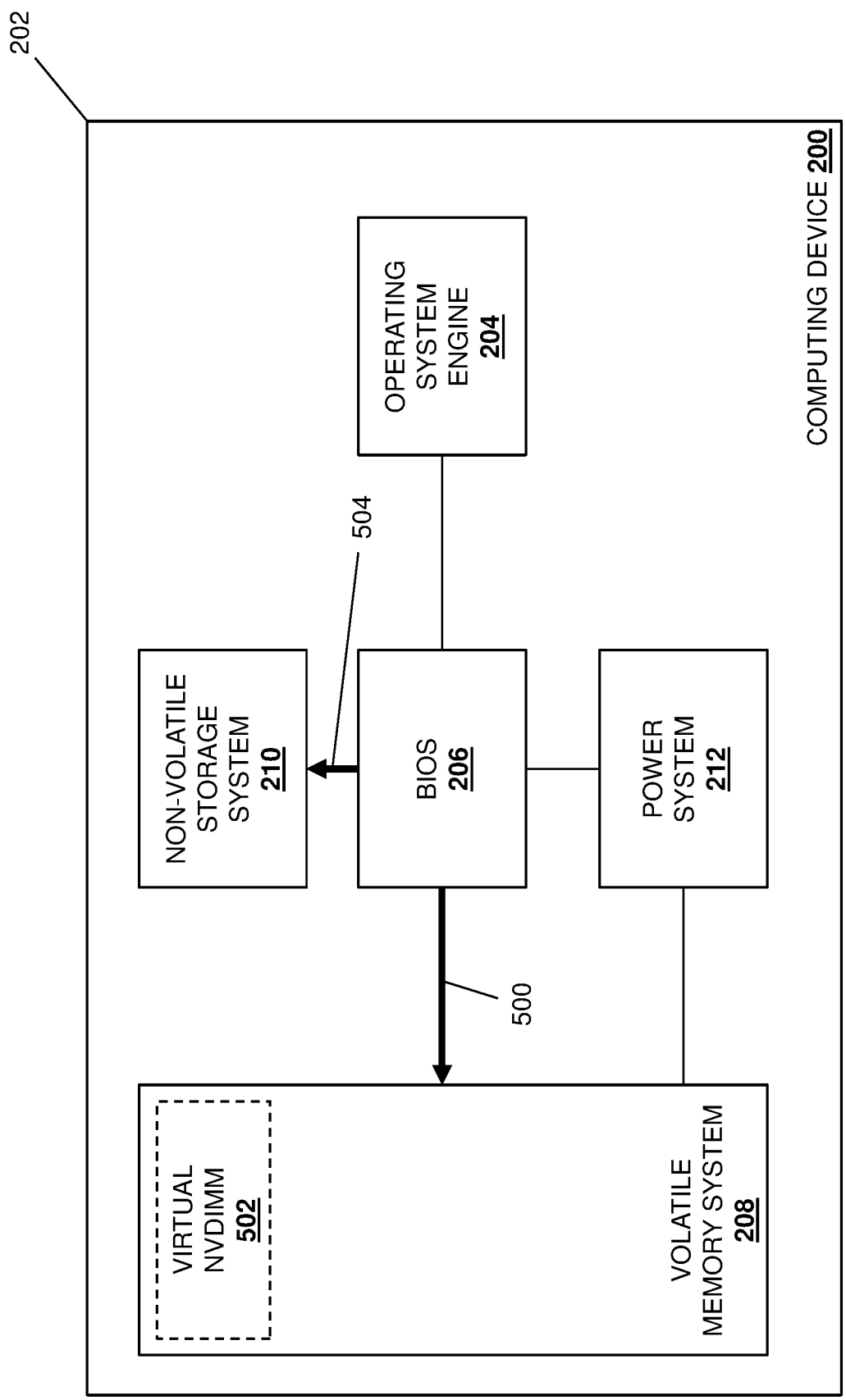
FIG. 5A is a schematic view illustrating an embodiment of the computing device of FIG. 2 operating during the method of FIG. 4.

The method 400 then proceeds to block 404 where the BIOS reserves a portion of a non-volatile storage system for storing virtual NVDIMM data. As also illustrated in FIG. 5A, in an embodiment of block 404, the BIOS engine 304 in the BIOS 206/300 may operate to perform non-volatile storage system reservation operations 504 in order to reserve a portion of the non-volatile storage system 210 for the storage of virtual NVDIMM data, discussed in further detail below. As will be appreciated by one of skill in the art in possession of the present disclosure, in some embodiments, the non-volatile storage system 210 may be utilized to provide two data region in order to enable the virtual non-volatile memory system functionality of the present disclosure: a first data region that may be used to store (and restore) otherwise volatile memory content (i.e., in the event of a storage/restore event), and a second data region that may be used to emulate a NVDIMM controller (which includes non-volatile storage that may be used to store label, error counters, Original Equipment Manufacturer (OEM) data, and/or other data known in the art).

As such, in one example of block 404, the BIOS engine 304 in the BIOS 206/300 may reserve the portion of the non-volatile storage system 210 for the storage of virtual NVDIMM data by storing the data needed to emulate a NVDIMM controller. As discussed above, physical NVDIMMs include Non-Volatile Random Access Memory (NVRAM) that may store label(s), error counters, OEM data, etc., and thus the non-volatile storage system reservation operations 504 may include the storage of those label(s), error counters, OEM data, etc., on the portion of the non-volatile storage system 210 that will be used to store virtual NVDIMM data in any manner that one of skill in the art in possession of the present disclosure will recognize will allow that portion of the non-volatile storage system 210 to be utilized similarly to a physical NVDIMM-N. However, while a specific technique for reserving a portion of a non-volatile storage system for the storage of virtual NVDIMM data has been described, one of skill in the art in possession of the present disclosure will recognize that portion(s) of non-volatile storage systems may be reserved for the storage of virtual NVDIMM data in other manners that will fall within the scope of the present disclosure as well.

Figure 5B:
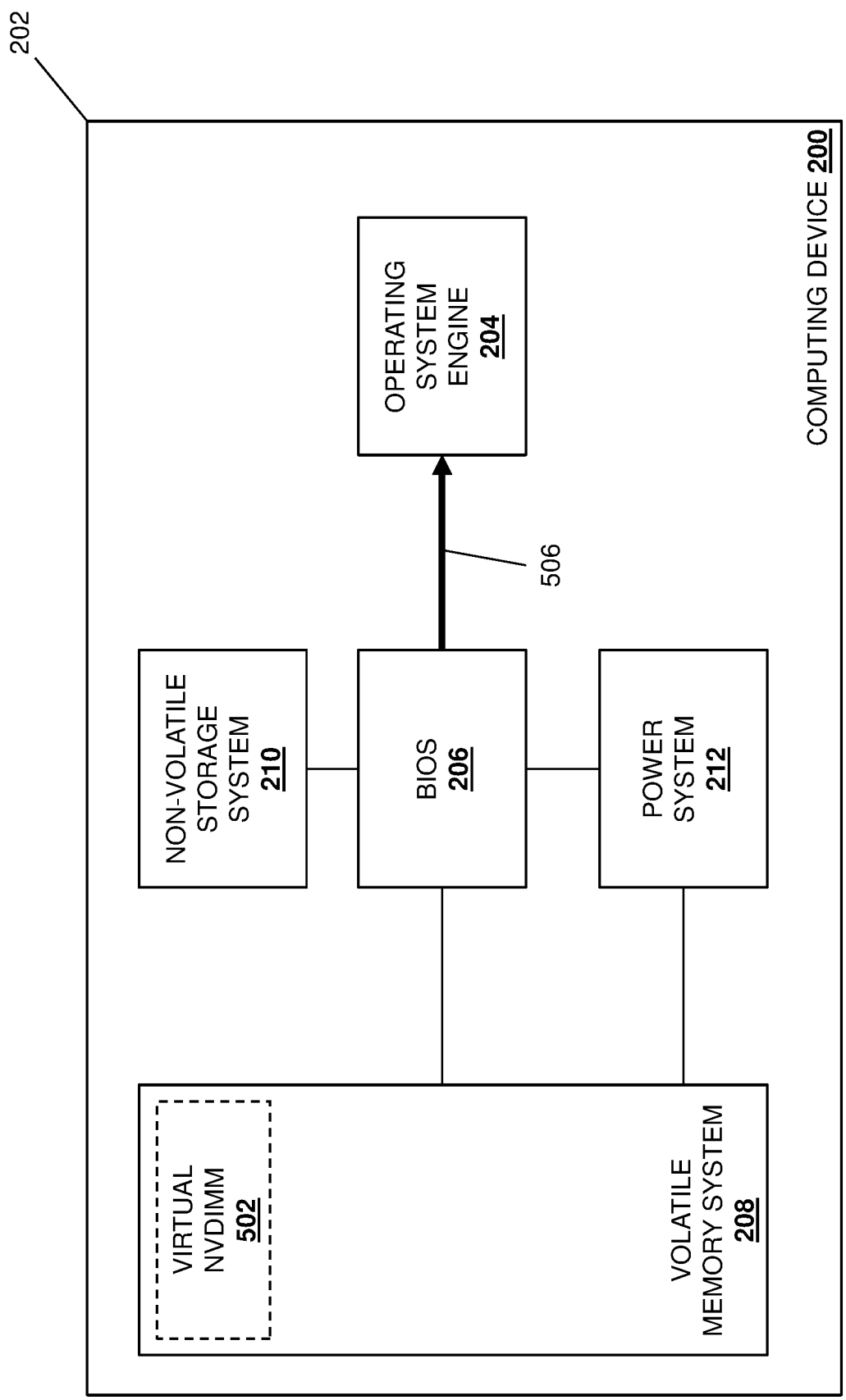
FIG. 5B is a schematic view illustrating an embodiment of the computing device of FIG. 2 operating during the method of FIG. 4.

The method 400 then proceeds to block 406 where the BIOS reports the virtual NVDIMM to an operating system using an NFIT. With reference to FIG. 5B, in an embodiment of block 406, the BIOS engine 304 in the BIOS 206/300 may operate to perform NFIT reporting operations 506 in order to report the virtual NVDIMM 502 to the operating system engine 204. For example, at block 406, the BIOS engine 304 in the BIOS 206/300 may access the memory map that was provided in the BIOS database 306 via the execution of the MRC, and use that memory map to generate an Advanced Configuration and Power Interface (ACPI) NVDIMM Firmware Interface Table (NFIT) that identifies the virtual NVDIMM 502 (which was designated as the portion of the volatile memory system 208 at block 402) as a NVDIMM-N, and provides the ACPI NFIT to the operating system engine 204 to report the virtual NVDIMM 502 to the operating system engine 204. As such, in some embodiments, the BIOS engine 304 in the BIOS 206/300 may be configured to support NVDIMM reporting via an ACPI NFIT. However, while a specific technique for reporting a virtual NVDIMM to an operating system has been described, one of skill in the art in possession of the present disclosure will recognize that the virtual NVDIMM of the present disclosure may be reported to an operating system in other manners that will fall within the scope of the present disclosure as well.

The method 400 then proceeds to optional block 408 where the BIOS emulates a NVDIMM controller. In an embodiment, at optional block 408, the BIOS engine 304 in the BIOS 206/300 may operate to emulate a NVDIMM controller for the virtual NVDIMM 502. As will be appreciated by one of skill in the art in possession of the present disclosure, physical NVDIMMs include NVDIMM controllers that may be utilized to communicate with operating systems and/or perform other NVDIMM controller functionality known in the art, and thus the BIOS engine 304 in the BIOS 206/300 may operate to emulate a NVDIMM controller for the virtual NVDIMM 502 at optional block 408 in order to communicate with the operating system engine 204 and/or perform any NVDIMM controller functionality for the virtual NVDIMM 204 while remaining within the scope of the present disclosure as well. For example, with reference to FIG. 5C, the BIOS 206 and the operating system engine 204 are illustrated as performing NVDIMM controller communication operations 508 that may include the operating system engine 204 generating an transmitting a NVDIMM request, and the BIOS engine in the BIOS 206/300 "intercepting" or otherwise receiving that NVDIMM request.

In a specific example, NVDIMM requests transmitted by the operating system engine 204 may include ACPI Device Specific Messages (DSMs) such as, for example, an ACPI DSM write instruction to write to a NVDIMM controller register in order to, for example, identify a battery connection for the virtual NVDIMM 502. As will be appreciated by one of skill in the art in possession of the present disclosure, physical NVDIMMs may utilize a local battery (e.g., a battery on-board the physical NVDIMM) or a system battery (e.g., a battery on the motherboard to which the physical NVDIMM is connected), and the operating system may read from registers in the NVDIMM controller for the physical NVDIMM in order to identify which type of battery is being utilized by that physical NVDIMM. As such, for the virtual NVDIMM 502 provided in this example, one of skill in the art in possession of the present disclosure will recognize that the ACPI DSM read and write instruction may include instructions to read and write to the virtual NVDIMM controller registers. Furthermore, one of skill in the art in possession of the present disclosure will appreciate that the BIOS 206/300 may emulate any reads and writes to NVDIMM-N controller registers, with the specific example of the emulation of the battery connection register provided above just one of many register emulation operations enabled by the teachings of the present disclosure.

In this specific example, in response to receiving the NVDIMM request from the operating system engine 204 during the NVDIMM controller communication operations 508, the BIOS engine 304 in the BIOS 206/300 may operate to modify a virtual register associated with the virtual NVDIMM 502 (e.g., in the BIOS database 306), and provide a NVDIMM response/confirmation to the operating system engine 204 as part of the NVDIMM controller communication operations 508. However, while specific NVDIMM controller communication operations have been described that provide for the reading from a virtual register associated with a virtual NVDIMM controller in order to identify a battery connection for the virtual NVDIMM 502, one of skill in the art in possession of the present disclosure will recognize that the BIOS engine 304 in the BIOS 206/300 may perform a variety of NVDIMM controller operations while emulating a NVDIMM controller for the virtual NVDIMM 502 at optional block 408 while remaining within the scope of the present disclosure as well. Furthermore, one of skill in the art in possession of the present disclosure will recognize that the BIOS database 306 or non-volatile storage system 210 may be used to emulate some/all of the emulated registers' content. For example, some NVDIMM controller registers may reset their content back to a default value in response to a power cycle/system reset and thus do not require non-volatile storage to save that content, while other NVDIMM controller registers may require that their content be kept persistent across power cycles/system resets and thus will need that content stored in non-volatile storage.

The method 400 then proceeds to decision block 410 where it is determined whether a virtual NVDIMM storage event has occurred. In an embodiment, at decision block 410, the BIOS engine 304 in the BIOS 206/300 may operate to monitor for virtual NVDIMM storage events. In the specific examples provided below, the virtual NVDIMM storage event is described as a power unavailability event that is reported to the BIOS 206 by the power system 212, but one of skill in the art in possession of the present disclosure will recognize that any other event that would conventionally result in the persistent storage of data provided on a physical NVDIMM will fall within the scope of the present disclosure as well, and thus the BIOS engine 304 in the BIOS 206/300 may monitor for those events at decision block 410 while remaining within the scope of the present disclosure.

Figure 5D:
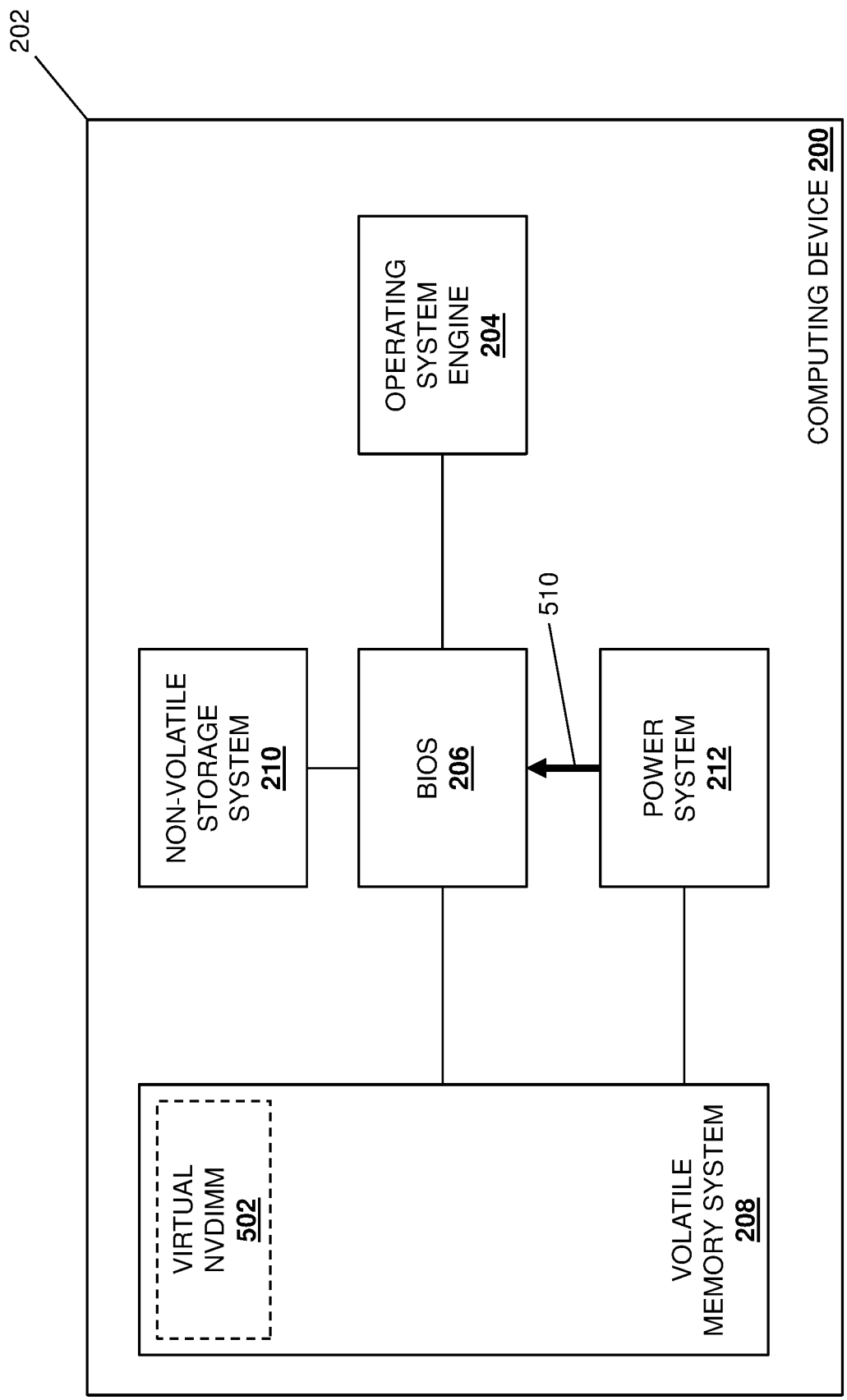
FIG. 5D is a schematic view illustrating an embodiment of the computing device of FIG. 2 operating during the method of FIG. 4.

If, at decision block 410, it is determined that a virtual NVDIMM storage event has not occurred, the method 400 returns to optional block 408. As such, following the designation of the portion of the volatile memory system 208 as the virtual NVDIMM 502 and the reserving of the portion of the non-volatile storage system 210 for the storage of virtual NVDIMM data, the method 400 may loop such that the BIOS 206 may emulate a NVDIMM controller, and continue to determine whether a virtual NVDIMM storage event has occurred, until a virtual NVDIMM storage event occurs. If at decision block 410, it is determined that a virtual NVDIMM storage event has occurred, the method 400 proceeds to block 412 where the BIOS copies data from the portion of the volatile memory system designated as a virtual NVDIMM to the portion of the non-volatile storage system reserved for storing virtual NVDIMM data. With reference to FIG. 5D, in an embodiment of decision block 410, the power system 212 may perform virtual NVDIMM storage event reporting operations 510 in order to report a virtual NVDIMM storage event to the BIOS 206 that causes the BIOS engine 304 in the BIOS 206/300 to determine that the virtual NVDIMM storage event has occurred. For example, in an embodiment of decision block 410, power from a portion of the power system 212 (e.g., AC power) may become unavailable during operation of the computing device 200, and a Complex Programmable Logic Device (CPLD) in the power system 212 may generate a System Management Interrupt (SMI) that is then received by the BIOS engine 304 in the BIOS 206/300 and causes the BIOS engine 304 to determine that a virtual NVDIMM storage event (e.g., an AC power unavailability event) has occurred. However, while a specific virtual NVDIMM storage event has been described, one of skill in the art in possession of the present disclosure will appreciate that other virtual NVDIMM storage events will fall within the scope of the present disclosure as well.

Figure 5E:
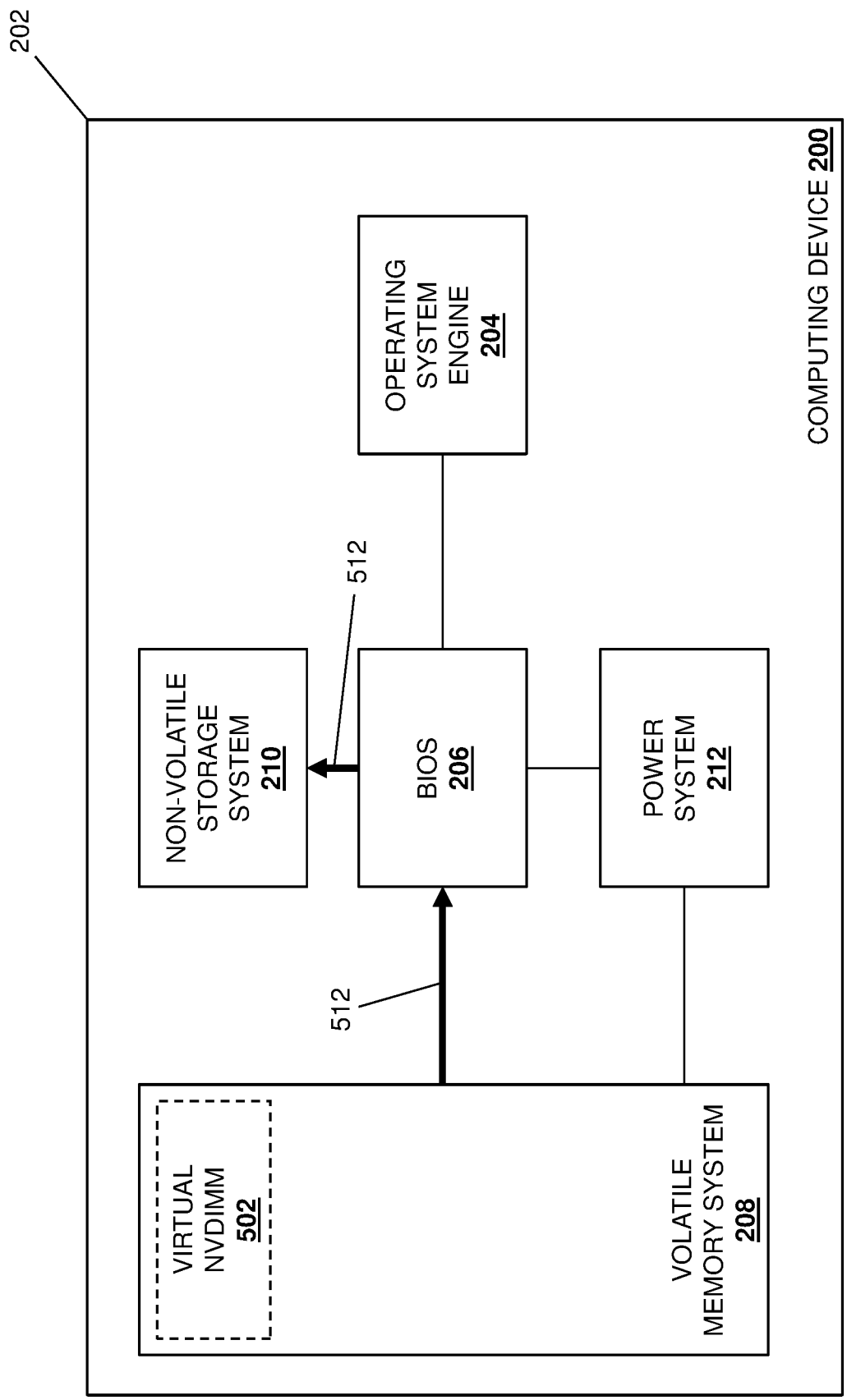
FIG. 5E is a schematic view illustrating an embodiment of the computing device of FIG. 2 operating during the method of FIG. 4.

With reference to FIG. 5E, in response to determining that the virtual NVDIMM storage event has occurred, at block 412 the BIOS engine 304 in the BIOS 206/300 may operate to perform virtual NVDIMM data persistent storage operations 512 to copy any data that is stored in the portion of the volatile memory system 208 that is designated as the virtual NVDIMM 502 to the portion of the non-volatile storage system 210 that is reserved for the storage of virtual NVDIMM data. As will be appreciated by one of skill in the art in possession of the present disclosure, the example of the virtual NVDIMM storage event provided by the AC power unavailability event discussed above may be followed by at least some of the components of the computing device 200 (e.g., the volatile memory system 208, the BIOS 206, etc.) operating on battery power (e.g., provided by the system battery discussed above), and the BIOS engine 204 in the BIOS 206/300 operating on that battery power to copy data (e.g., that was previously stored by the operating system engine 204) from the memory range in the volatile memory system 208 that was designated as the virtual NVDIMM to an HDD and/or NVMe SSD that is included in the non-volatile storage system 210 and that was reserved for the storage of virtual NVDIMM data.

Figure 5F:
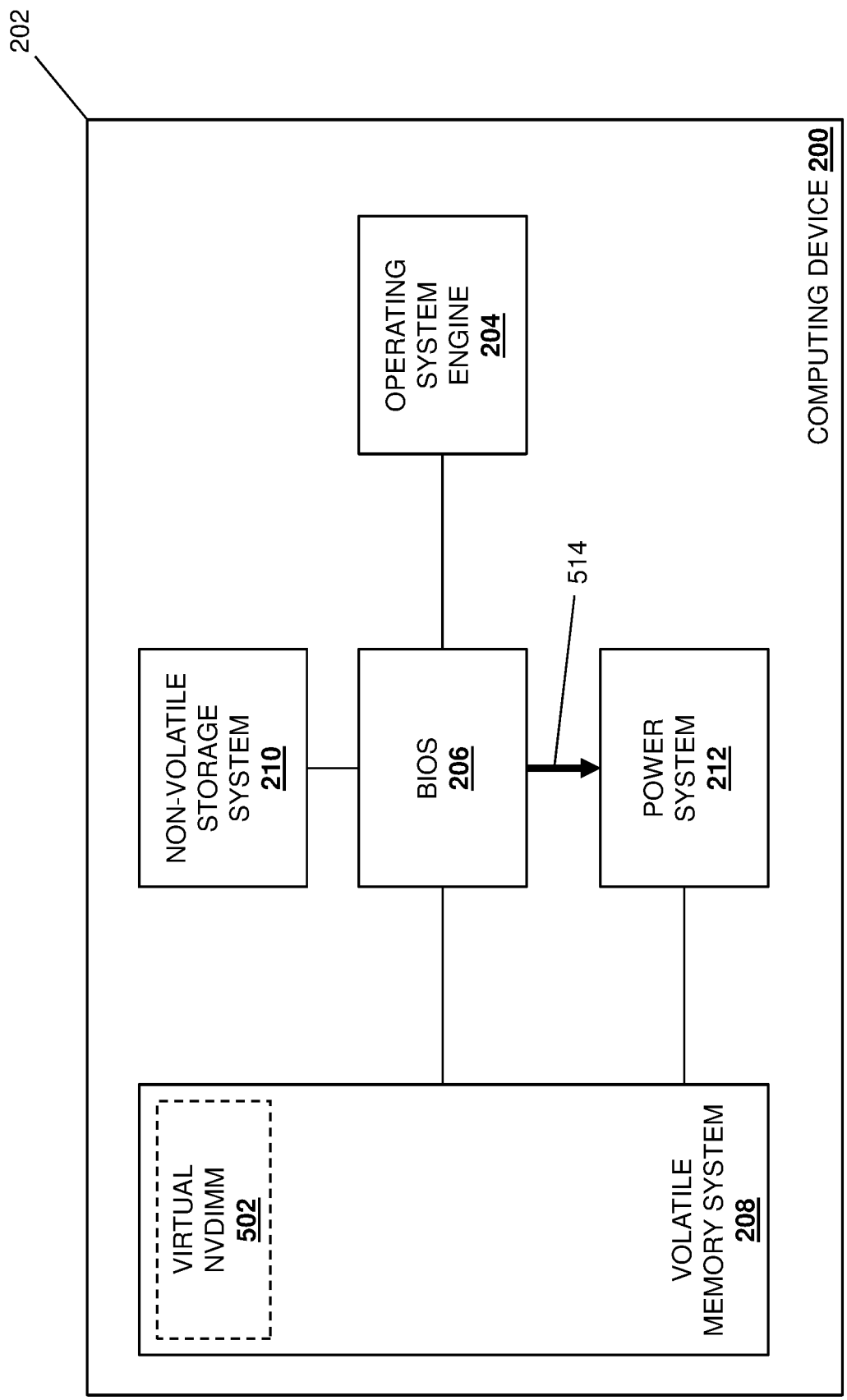
FIG. 5F is a schematic view illustrating an embodiment of the computing device of FIG. 2 operating during the method of FIG. 4.

With reference to FIG. 5F, following the copying of the data that is stored in the portion of the volatile memory system 208 that is designated as the virtual NVDIMM 502 to the portion of the non-volatile storage system 210 that is reserved for the storage of virtual NVDIMM data, the BIOS engine 304 in the BIOS 206/300 may operate to perform virtual NVDIMM persistent storage completion reporting operations 514 to report the completion of the virtual NVDIMM data persistent storage operations 512 to the power system 212. For example, the virtual NVDIMM persistent storage completion reporting operations 514 may include the BIOS engine 304 in the BIOS 206/300 reporting the completion of the virtual NVDIMM data persistent storage operations 512 to the CPLD in the power system 212, which may be followed by the CPLD in the power system 212 turning off power to the computing device 200 (e.g., preventing the battery power from the system battery from powering the components of the computing device 200 as discussed above). As will be appreciated by one of skill in the art in possession of the present disclosure, the copying of the data that is stored in the portion of the volatile memory system 208 that is designated as the virtual NVDIMM 502 to the portion of the non-volatile storage system 210 that is reserved for the storage of virtual NVDIMM data provides for the persistent storage of that data on the non-volatile storage system 210 (e.g., an HDD and/or NVMe SSD). As such, while the lack of AC power and battery power to the non-volatile memory system 208 will cause data stored on the portion of the volatile memory system 208 that is designated as the virtual NVDIMM 502 to be lost, a copy of that data remains persistently stored on the non-volatile storage system 210.

The method 400 then proceeds to decision block 414 where it is determined whether a virtual NVDIMM recovery event has occurred. In an embodiment, at decision block 414, the BIOS engine 304 in the BIOS 206/300 may operate to monitor for virtual NVDIMM recovery events. In the specific examples provided below, the virtual NVDIMM recovery event is described as a power availability event that is detected by the BIOS 206, but one of skill in the art in possession of the present disclosure will recognize that any other persistent data recovery events will fall within the scope of the present disclosure as well, and thus the BIOS engine 304 in the BIOS 206/300 may monitor for those events at decision block 414 while remaining within the scope of the present disclosure. If, at decision block 414, it is determined that a virtual NVDIMM recovery event has not occurred, the method 400 returns to decision block 414. As such, following the copying of the data that is stored in the portion of the volatile memory system 208 that is designated as the virtual NVDIMM 502 to the portion of the non-volatile storage system 210 that is reserved for the storage of virtual NVDIMM data, the method 400 may loop to monitor for the virtual NVDIMM recovery event until such an event is detected by the BIOS 206.

If at decision block 414, it is determined that a virtual NVDIMM recovery event has occurred, the method 400 proceeds to block 416 where the BIOS copies data from the portion of the non-volatile storage system reserved for storing virtual NVDIMM data to the portion of the volatile memory system designated as a virtual NVDIMM. In an embodiment, at decision block 414, the BIOS engine 304 in the BIOS 206/300 may detect a virtual NVDIMM storage recovery event. For example, in an embodiment of decision block 414, power from a portion of the power system 212 (e.g., AC power) may become available following its unavailability (e.g., resulting in a power-on or other initialization of the computing device 200), and the BIOS engine 304 in the BIOS 206/300 may determine that a virtual NVDIMM recovery event (e.g., an AC power availability event) has occurred. However, while a specific virtual NVDIMM recovery event has been described, one of skill in the art in possession of the present disclosure will appreciate that other virtual NVDIMM recovery events will fall within the scope of the present disclosure as well.

Figure 5G:
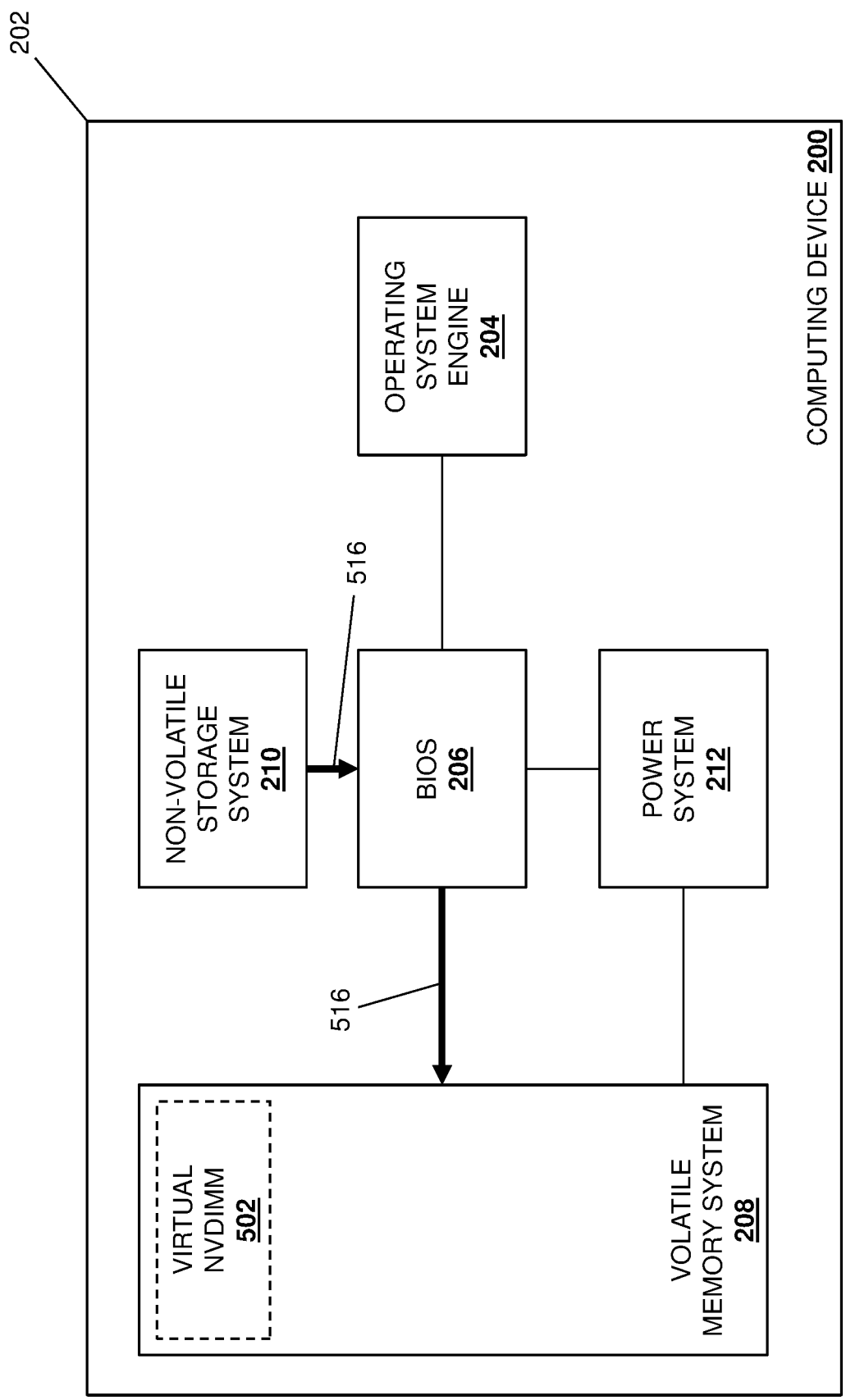
FIG. 5G is a schematic view illustrating an embodiment of the computing device of FIG. 2 operating during the method of FIG. 4.

With reference to FIG. 5G, in response to determining that the virtual NVDIMM recovery event has occurred, at block 416 the BIOS engine 304 in the BIOS 206/300 may operate to perform virtual NVDIMM data recovery operations 516 to copy any data that is stored in the portion of the non-volatile storage system 210 that is reserved for the storage of virtual NVDIMM data to the portion of the volatile memory system 208 that is designated as the virtual NVDIMM 502. As will be appreciated by one of skill in the art in possession of the present disclosure, the example of the virtual NVDIMM recovery event provided by the AC power availability event discussed above may be followed by the computing device 200 operating on system power (e.g., provided by the AC power system discussed above), and the BIOS engine 204 in the BIOS 206/300 copying data from an HDD and/or NVMe SSD that is included in the non-volatile storage system 210 and that was reserved for the storage of virtual NVDIMM data to a memory range in the volatile memory system 208 that was designated as the virtual NVDIMM 502. As such, once power is restored to the volatile memory system 208, the BIOS 206 may operate to provide the data that was previously stored in the virtual NVDIMM 502 (i.e., prior to the power unavailability) back on that virtual NVDIMM 502.

Thus, systems and methods have been described that provide a virtual NVDIMM using a combination of volatile DIMMs and a non-volatile HDDs or NVMe SSDs, and report the virtual NVDIMM to an operating system using an ACPI NFIT, which allows standard operating systems to utilize the virtual NVDIMM in the same manner as a physical NVDIMM. For example, the virtual non-volatile memory system includes a BIOS that is coupled to a non-volatile HDDs or NVMe SSDs and volatile DIMMs, and the BIOS operates to designate a portion of the volatile DIMMs as a virtual NVDIMM, reserve a portion of the non-volatile HDDs or NVMe SSDs for storing virtual NVDIMM data, report the virtual NVDIMM to an operating system using an ACPI NFIT, and emulate a NVDIMM controller. The BIOS may then determine that a virtual NVDIMM storage event has occurred and, in response, copy data from the portion of the volatile DIMMs designated as the virtual NVDIMM to the portion of the non-volatile HDDs or NVMe SSDs reserved for storing virtual NVDIMM data. As such, non-NVDIMM devices may be reported to standard operating systems via an ACPI NFIT, which allows those operating systems to support C2F techniques, NVDIMM-N functionality in DDR5 memory systems that do not support physical NVDIMM-Ns, and/or other NVDIMM operations that would be apparent to one of skill in the art in possession of the present disclosure.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A virtual non-volatile memory system, comprising:
a non-volatile storage system;
a volatile memory system; and
a Basic Input/Output System (BIOS) that is coupled to the non-volatile storage system and the volatile memory system, wherein the BIOS is configured to:
designate a portion of the volatile memory system as a virtual Non-Volatile Dual Inline Memory Module (NVDIMM);
reserve a first portion of the non-volatile storage system for storing virtual NVDIMM data;
store NVDIMM controller emulation data in a second portion of the non-volatile storage system;
report the virtual NVDIMM to an operating system using a NVDIMM Firmware Interface Table (NFIT);
emulate an NVDIMM controller for the virtual NVDIMM using the NVDIMM controller emulation data stored in the second portion of the non-volatile storage system, wherein the emulating the NVDIMM controller includes:
providing a virtual NVDIMM register for the virtual NVDIMM in a BIOS database included in the BIOS;
intercepting read and write instructions generated by the operating system and directed to the virtual NVDIMM;
executing, using the virtual NVDIMM register, the read and write instructions; and
transmitting, to the operating system in response to executing the read and write instructions, at least one response;
determine that a virtual NVDIMM storage event has occurred; and
copy, in response to determining that the virtual NVDIMM storage event has occurred, data from the portion of the volatile memory system designated as the virtual NVDIMM to the first portion of the non-volatile storage system reserved for storing virtual NVDIMM data.

2. The system of claim 1, wherein the BIOS is configured to:
determine that a virtual NVDIMM recovery event has occurred;
copy, in response to determining that the virtual NVDIMM recovery event has occurred, the data stored in the first portion of the non-volatile storage system reserved for storing virtual NVDIMM data to the portion of the volatile memory system designated as the virtual NVDIMM.

3. The system of claim 1, wherein the virtual NVDIMM storage event include a system power unavailability event, and wherein the BIOS utilizes battery power to copy the data from the portion of the volatile memory system designated as the virtual NVDIMM to the first portion of the non-volatile storage system reserved for storing virtual NVDIMM data.

4. The system of claim 1, wherein the designating the portion of the volatile memory system as the virtual NVDIMM includes:
identifying, via the execution of Memory Reference Code (MRC), the portion of the volatile memory system; and
modifying the identification of the portion of the volatile memory system to indicate that the portion of the volatile memory system is a NVDIMM.

5. The system of claim 1, wherein the storing the NVDIMM controller emulation data in the second portion of the non-volatile storage system includes storing at least one of a label and Original Equipment Manufacturer (OEM) data on the second portion of the non-volatile storage system.

6. An Information Handling System (IHS), comprising:
a processing system; and
a memory system that is coupled to the processing system and that includes instructions that, when executed by the processing system, cause the processing system to provide a Basic Input/Output System (BIOS) engine that is configured to:
designate a portion of a volatile memory system as a virtual Non-Volatile Dual Inline Memory Module (NVDIMM);
reserve a first portion of a non-volatile storage system for storing virtual NVDIMM data;
store NVDIMM controller emulation data in a second portion of the non-volatile storage system;
report the virtual NVDIMM to an operating system using a NVDIMM Firmware Interface Table (NFIT);
emulate an NVDIMM controller for the virtual NVDIMM using the NVDIMM controller emulation data stored in the second portion of the non-volatile storage system, wherein the emulating the NVDIMM controller includes
providing a virtual NVDIMM register for the virtual NVDIMM in a BIOS database included in the BIOS;
intercepting read and write instructions generated by the operating system and directed to the virtual NVDIMM;
executing, using the virtual NVDIMM register, read and write instructions; and
transmitting, to the operating system in response to executing the read and write instructions, at least one response;
determine that a virtual NVDIMM storage event has occurred; and
copy, in response to determining that the virtual NVDIMM storage event has occurred, data from the portion of the volatile memory system designated as the virtual NVDIMM to the first portion of the non-volatile storage system reserved for storing virtual NVDIMM data.

7. The IHS of claim 6, wherein the BIOS engine is configured to:
determine that a virtual NVDIMM recovery event has occurred;
copy, in response to determining that the virtual NVDIMM recovery event has occurred, the data stored in the first portion of the non-volatile storage system reserved for storing virtual NVDIMM data to the portion of the volatile memory system designated as the virtual NVDIMM.

8. The IHS of claim 6, wherein the virtual NVDIMM storage event include a system power unavailability event, and wherein the BIOS engine utilizes battery power to copy the data from the portion of the volatile memory system designated as the virtual NVDIMM to the first portion of the non-volatile storage system reserved for storing virtual NVDIMM data.

9. The IHS of claim 6, wherein the designating the portion of the volatile memory system as the virtual NVDIMM includes:
 identifying, via the execution of Memory Reference Code (MRC), the portion of the volatile memory system; and
 modify the identification of the portion of the volatile memory system to indicate that the portion of the volatile memory system is a NVDIMM.

10. The IHS of claim 6, wherein the storing the NVDIMM controller emulation data in the second portion of the non-volatile storage system includes storing at least one of a label and Original Equipment Manufacturer (OEM) data on the second portion of the non-volatile storage system.

11. The IHS of claim 6, wherein the read and write instructions generated by the operating system includes Advanced Configuration and Power Interface (ACPI) Device Specific Message (DSM) read and write instructions.

12. A method for providing virtual non-volatile memory, comprising:
 designating, by a Basic Input/Output System (BIOS), a portion of a volatile memory system as a virtual Non-Volatile Dual Inline Memory Module (NVDIMM);
 reserving, by the BIOS, a first portion of a non-volatile storage system for storing virtual NVDIMM data;
 storing, by the BIOS, NVDIMM controller emulation data in a second portion of the non-volatile storage system that stores data used to emulate a NVDIMM controller;
 reporting, by the BIOS, the virtual NVDIMM to an operating system using a NVDIMM Firmware Interface Table (NFIT);
 emulating, by the BIOS, an NVDIMM controller for the virtual NVDIMM using the NVDIMM controller emulation data stored in the second portion of the non-volatile storage system, wherein the emulating the NVDIMM controller includes:
  providing a virtual NVDIMM register for the virtual NVDIMM in a BIOS database included in the BIOS;
  intercepting read and write instructions generated by the operating system and directed to the virtual NVDIMM;
  executing, using the virtual NVDIMM register, the read and write instructions; and
  transmitting, to the operating system in response to executing the read and write instructions, at least one response;
 determining, by the BIOS, that a virtual NVDIMM storage event has occurred; and
 copying, by the BIOS in response to determining that the virtual NVDIMM storage event has occurred, data from the portion of the volatile memory system designated as the virtual NVDIMM to the first portion of the non-volatile storage system reserved for storing virtual NVDIMM data.

13. The method of claim 12, further comprising:
 determining, by the BIOS, that a virtual NVDIMM recovery event has occurred;
 copying, by the BIOS in response to determining that the virtual NVDIMM recovery event has occurred, the data stored in the first portion of the non-volatile storage system reserved for storing virtual NVDIMM data to the portion of the volatile memory system designated as the virtual NVDIMM.

14. The method of claim 12, wherein the virtual NVDIMM storage event include a system power unavailability event, and wherein the BIOS utilizes battery power to copy the data from the portion of the volatile memory system designated as the virtual NVDIMM to the first portion of the non-volatile storage system reserved for storing virtual NVDIMM data.

15. The method of claim 12, wherein the designating the portion of the volatile memory system as the virtual NVDIMM includes:
 identifying, via the execution of Memory Reference Code (MRC), the portion of the volatile memory system; and
 modify the identification of the portion of the volatile memory system to indicate that the portion of the volatile memory system is a NVDIMM.

16. The method of claim 12, wherein the storing the NVDIMM controller emulation data in the second portion of the non-volatile storage system includes storing at least one of a label and Original Equipment Manufacturer (OEM) data on the second portion of the non-volatile storage system.

17. The method of claim 12, wherein the read and write instructions generated by the operating system include Advanced Configuration and Power Interface (ACPI) Device Specific Message (DSM) read and write instructions.

* * * * *

UNITED STATES PATENT AND TRADEMARK OFFICE
CERTIFICATE OF CORRECTION

| | | |
|---|---|---|
| PATENT NO. | : 11,340,835 B2 | Page 1 of 1 |
| APPLICATION NO. | : 16/940516 | |
| DATED | : May 24, 2022 | |
| INVENTOR(S) | : Chao et al. | |

It is certified that error appears in the above-identified patent and that said Letters Patent is hereby corrected as shown below:

In the Claims

Claim 11, Column 15, Line 15, "includes" should be changed to --include--.

Signed and Sealed this
Thirtieth Day of August, 2022

Katherine Kelly Vidal
*Director of the United States Patent and Trademark Office*